United States Patent
Maeda et al.

(10) Patent No.: US 6,738,338 B1
(45) Date of Patent: May 18, 2004

(54) NEAR-FIELD OPTICAL HEAD, METHOD OF FABRICATING SAME, AND OPTICAL DRIVE USING SAME

(75) Inventors: Hidetaka Maeda, Chiba (JP); Takashi Niwa, Chiba (JP); Kenji Kato, Chiba (JP); Susumu Ichihara, Chiba (JP); Norio Chiba, Chiba (JP); Yasuyuki Mitsuoka, Chiba (JP); Manabu Oumi, Chiba (JP); Nobuyuki Kasama, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/527,093

(22) Filed: Mar. 16, 2000

(30) Foreign Application Priority Data

Mar. 17, 1999 (JP) .............................. 11-072215
Mar. 6, 2000 (JP) ........................... 2000-061017

(51) Int. Cl.⁷ ................................................. G11B 7/00
(52) U.S. Cl. ................ 369/112.01; 369/118; 369/13.33
(58) Field of Search .................... 369/112.23, 108, 369/112.1, 112.07, 112.02, 126, 44.12, 44.23, 244, 219, 118, 13.33, 44.14, 112.01; 250/306, 216, 201.3, 307; 438/48; 355/53, 67; 359/288, 739; 360/48

(56) References Cited

U.S. PATENT DOCUMENTS

| | | | | |
|---|---|---|---|---|
| 5,615,203 A | * | 3/1997 | Fukakusa | 369/244 |
| 5,742,437 A | * | 4/1998 | Eguchi et al. | 359/739 |
| 5,781,331 A | * | 7/1998 | Carr et al. | 359/288 |
| 5,808,973 A | * | 9/1998 | Tanaka | 369/14 |
| 5,859,814 A | * | 1/1999 | Kino et al. | 369/13.33 |
| 6,075,665 A | * | 6/2000 | Chainer et al. | 360/48 |
| 6,104,030 A | * | 8/2000 | Chiba et al. | 250/306 |
| 6,214,633 B1 | * | 4/2001 | Clark et al. | 438/48 |
| 6,262,414 B1 | * | 7/2001 | Mitsuhashi | 250/216 |
| 6,298,029 B1 | * | 10/2001 | Miyauchi et al. | 369/112.23 |
| 6,335,522 B1 | * | 1/2002 | Shimada et al. | 250/201.3 |
| 6,340,813 B1 | * | 1/2002 | Tominaga et al. | 250/216 |
| 6,351,436 B1 | * | 2/2002 | Mallary | 369/13.17 |

\* cited by examiner

*Primary Examiner*—William Korzuch
*Assistant Examiner*—Kim-Kwok Chu
(74) *Attorney, Agent, or Firm*—Adams & Wilks

(57) ABSTRACT

There is disclosed a near-field optical head having an microscopic aperture whose size can be varied. The optical head comprises a substrate of silicon. A hole in the form of an inverted cone is formed in the substrate. The top portion of this hole forms the microscopic aperture. A support portion for supporting an actuator is formed on the substrate. The actuator holds a light-blocking film in such a way that the light-blocking film stays in the hole and that the bottom surface of the light-blocking film is flush with the bottom surface of the microscopic aperture. The light-blocking film is moved by the actuator to change the aperture to desired size.

27 Claims, 13 Drawing Sheets

F I G. 1 3 A 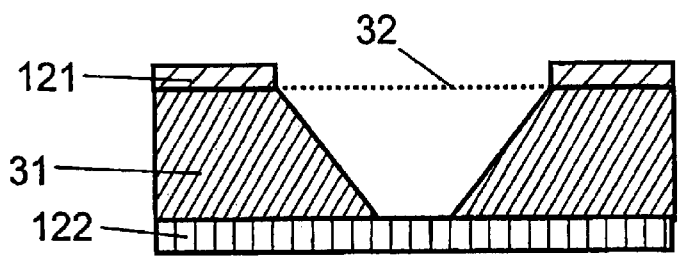
F I G. 1 3 B 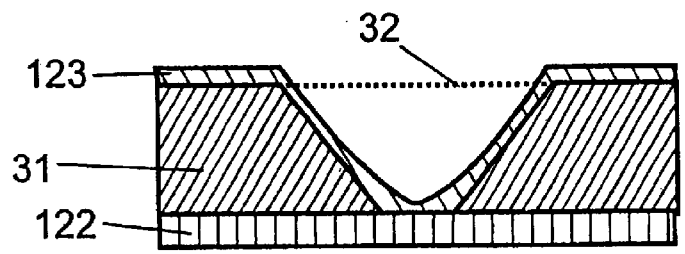
F I G. 1 3 C 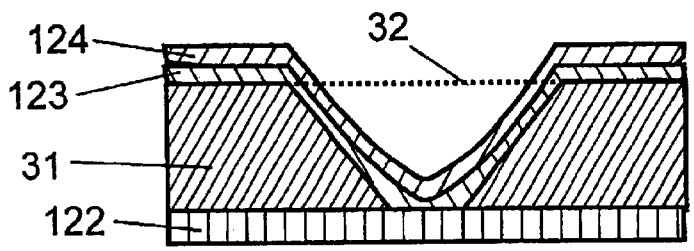
F I G. 1 3 D 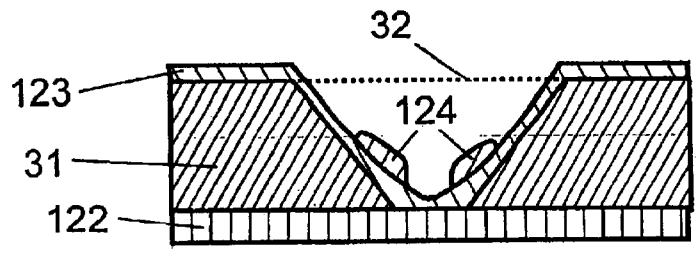
F I G. 1 3 E 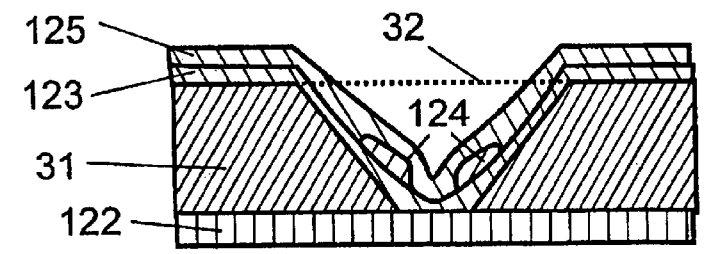
F I G. 1 3 F 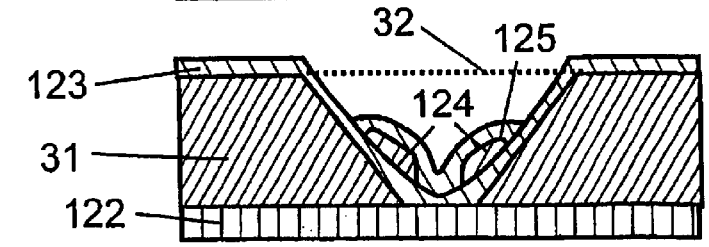

NEAR-FIELD OPTICAL HEAD, METHOD OF FABRICATING SAME, AND OPTICAL DRIVE USING SAME

BACKGROUND OF THE INVENTION

The present invention relates to a near-field optical head that can be used as a near-field optical read/write head or as a probe head for a scanning near-field microscope and to a method of fabricating the optical head. More particularly, the invention relates to a near-field optical head having a microscopic aperture whose size can be changed and to a method of fabricating such a near-field optical head.

A known near-field optical head is shown in FIGS. 15(a) and 15(b), where the optical head is generally indicated by numeral 200. FIG. 15(a) is a cross-sectional view of the near-field optical head 200. FIG. 15(b) is a top plan view of the optical head 200. This head 200 has a silicon substrate 201 provided with an inverted conical hole 202. The top portion of this hole 202 forms a microscopic aperture 203 having a size b less than the wavelength of light. If propagating light is made to hit this microscopic aperture 203, near-field light is generated near the aperture 203 opposite the illuminated side, because the size b is shorter than the wavelength of the light. The propagating light is laser light, for example.

Where the near-field optical head 200 is used as a near-field read/write head, near-field light produced near the microscopic aperture 203 is made to hit a recording medium so that the surface structure or material undergoes a local change. In this way, information is recorded. Otherwise, the local change of the surface structure or material is detected, thus reading information. On the other hand, where the near-field optical head 200 is used as a probe head for a scanning near-field microscope, near-field light produced near the microscopic aperture 203 is made to hit the surface of a sample, scattering the near-field light. This results in propagating light, which in turn is detected to measure the optical characteristics or topography of the sample surface.

With the above-described near-field optical head 200, it has been difficult to form the microscopic aperture 203 with a size less than 100 nm reliably. Furthermore, it has been impossible to vary the size of the aperture 203. Where the near-field optical head 200 is used as a near-field optical recording read/write head, it is necessary to move the heavy head assembly during tracking for reading signals. Therefore, it has been difficult to place the head in position accurately and quickly.

SUMMARY OF THE INVENTION

In view of the foregoing, the present invention has been made. It is an object of the present invention to provide a near-field optical head having a microscopic aperture whose size can be varied.

It is another object of the invention to provide a method of fabricating this near-field optical head.

A near-field optical head set forth in one aspect and achieving the above-described objects comprises a substrate provided with a hole whose top portion forms a microscopic aperture. An aperture-limiting means is located inside the hole. A moving means for moving the aperture-limiting means is mounted. The aperture-limiting means is moved to limit the size of the microscopic aperture.

In this near-field optical head, the aperture-limiting means is positioned inside the hole formed in the substrate. The aperture-limiting means is moved by the moving means, thereby changing the size of the microscopic aperture. Hence, the microscopic aperture can be modified to desired size.

A near-field optical head in another aspect and achieving the above-described objects comprises a substrate provided with a hole whose top portion forms a microscopic aperture and a pair of aperture-limiting means inside the hole. Moving means are mounted to move the aperture-limiting means, respectively. The size of the microscopic aperture is limited by moving the aperture-limiting means.

In this near-field optical head, the two limiting means are located symmetrically with respect to the microscopic aperture. The aperture-limiting means are moved by their respective moving means, thereby modifying the size of the aperture. Therefore, the microscopic aperture can be varied to a desired size. Since the aperture can be moved over a recording track formed on a recording medium while maintaining constant the size of the aperture by moving the limiting means in synchronism, tracking can be done.

A near-field optical head in another aspect is characterized in that the aforementioned aperture-limiting means has a bottom surface flush with the bottom surface of the microscopic aperture.

In this near-field optical head, the aperture-limiting means are so positioned that their bottom surface is flush with the bottom surface of the microscopic aperture. This permits either a recording medium or a sample to be moved toward the microscopic aperture.

A near-field optical head in another aspect is characterized in that the moving means described above is a piezoelectric actuator or an electrostatic actuator.

In this near-field optical head, the aperture-limiting means is moved using the piezoelectric or electrostatic actuator. Therefore, the microscopic aperture can be changed to a desired size easily and accurately.

A near-field optical head in another aspect comprises a substrate provided with a hole whose top portion form a microscopic aperture and an aperture-limiting means positioned inside the hole. The aperture-limiting means is heated and expanded to thereby limit the size of the microscopic aperture.

In this near-field optical head, the aperture-limiting means that expands on heating is located inside the hole formed in the substrate. On expansion, the aperture-limiting means blocks propagating light and so the size of the microscopic aperture can be modified to a desired size by expanding the aperture-limiting means. Note that the aperture-limiting means can be heated by illuminating it with propagating light, for example.

A near-field optical head in another aspect is characterized in that there is provided a heating means for heating the aperture-limiting means.

In this near-field optical head, the heating means for heating the aperture-limiting means is mounted. Therefore, the aperture-limiting means can be expanded easily and accurately. The microscopic aperture can be modified to a desired size.

A near-field optical head in another aspect is characterized in that the aforementioned aperture-limiting means consists of a high polymer having a high coefficient of thermal expansion or a high polymer sealed with a gas.

In this near-field optical head, the aperture-limiting means is a high polymer having a high coefficient of thermal expansion or a high polymer sealed with a gas. Therefore, the aperture-limiting means can be expanded efficiently with a small amount of heat. The microscopic aperture can be modified to desired size.

A method of fabricating a near-field optical head as set forth above and achieving the objects described above starts with preparing a substrate. A hole is formed in this substrate such that the top portion form a microscopic aperture. An aperture-limiting means is positioned in the hole. A moving means for moving the aperture-limiting means is mounted. The size of the aperture is limited by moving the aperture-limiting means. A support means for supporting the moving means is deposited on a surface of the substrate that faces away from the aperture. Then, a sacrificial film is deposited on the substrate and on the support means. A light-blocking film is deposited on the sacrificial film. The light-blocking film is patterned to form the aforementioned aperture-limiting means. The support means is exposed, and the moving means described above is formed on this exposed support means. Finally, the sacrificial film is removed except for its portion located inside the hole.

In this method of fabricating a near-field optical head, the hole is formed in the substrate. The support means is deposited on the substrate. The sacrificial film is deposited on the substrate and on the support means. The light-blocking film is deposited on the sacrificial film and patterned to form the aperture-limiting means. The support means is exposed, and the moving means is formed on this support means. Finally, the sacrificial film is removed. Consequently, the aperture-limiting means that can be moved by the moving means can be formed inside the hole. The microscopic aperture can be modified to desired size by moving the aperture-limiting means by means of the moving means.

A method of fabricating a near-field optical head in another aspect is characterized in that the moving means described above is a piezoelectric or electrostatic actuator.

In the above-described method of fabricating a near-field optical head, the aperture-limiting means is moved by the use of a piezoelectric or electrostatic actuator. Therefore, the aperture-limiting means can be moved easily and accurately. The microscopic aperture can be modified to desired size.

A method of fabricating a near-field optical head another aspect in starts with preparing a substrate or a base. A hole is formed in the substrate such that the top portion forms a microscopic aperture. A film of a high polymer having a high coefficient of thermal expansion is deposited inside the hole. The film is patterned to form an aperture-limiting means located inside the hole. The size of the aperture can be limited by expanding the aperture-limiting means.

In this method of fabricating a near-field optical head, the hole is formed in the substrate. The film of a high polymer having a high coefficient of thermal expansion is deposited inside the hole. The film is patterned to form the aperture-limiting means. Therefore, the aperture-limiting means that expands on heating can be formed inside the hole. The microscopic aperture can be modified to desired size.

A method of fabricating a near-field optical head in another aspect starts with preparing a substrate or a base. A hole is formed in the substrate such that the top portion forms a microscopic aperture. A first film of a high polymer is deposited at least inside the hole. A sacrificial film is deposited on the first film of high polymer and patterned. A second film of a high polymer is deposited on the sacrificial film. A hole is formed in the second film of high polymer. The portion of the sacrificial film sandwiched between the first and second films is removed, thus forming a hollow portion. A gas is injected into the hollow portion. A high polymer is deposited in the hole in the second film of high polymer, thus forming an aperture-limiting means. The aperture-limiting means is expanded to limit the size of the microscopic aperture.

In the above-described method of forming a near-field optical head, a hole is formed in the substrate. The first film of high polymer is deposited inside the hole. The sacrificial film is deposited on the first film and patterned. The second film of high polymer is deposited on the sacrificial film. A hole is formed in the second film. That portion of the sacrificial film sandwiched between the first and second films is removed using the hole. Thus, a hollow portion is formed. A gas is injected into the hollow portion. A high polymer is deposited, and the hole in the second film is closed off. Therefore, the gas is sealed in the hollow portion. An aperture-limiting means that expands on heating can be formed. The microscopic aperture can be modified to desired size by expanding the aperture-limiting means.

An optical drive as in another aspect is an optical drive having a near-field optical head equipped with a substrate provided with a hole whose top portion forms a microscopic aperture, the optical drive acting to record and/or read information to and from a recording medium. An aperture control means has an aperture-limiting means located inside the aperture and having a moving means for moving the aperture-limiting means to limit the size of the microscopic aperture by moving the aperture-limiting means. A rotational speed control means for controlling the rotational speed of the recording medium is provided. The optical drive further includes an operation mode control means for determining the combination of a data transfer rate and a recording density.

In accordance with this aspect of the invention, the read/write rates, the capacity, and other factors can be varied according to application of data recorded. Therefore, less wasteful recording and reading can be accomplished. Consequently, it is possible to set up the optical drive by taking account of the power consumption and so forth of the drive where it is regarded as a recorder. Hence, an optical drive having excellent portability can be accomplished.

An optical drive in another aspect is based on the optical drive set forth in above and further characterized in that the data transfer rate and the recording density can be selected from values distributed successively within a range defined by preset upper limit value and lower limit value.

In this aspect of the invention, the read/write rates, the capacity, and other factors can be varied continuously according to the application of recorded data. Therefore, optimal recording and reading can be done for various applications.

An optical drive as in another aspect is based on the optical drive set forth above and further characterized in that the aforementioned aperture-limiting means and rotational speed control means are operated according to the combination of the data transfer rate and recording density determined by the operation mode control means described above.

In this aspect of the invention, the size of the aperture in the near-field optical head and the read/write rates which are important for recording and reading using near-field light can be varied simultaneously. Therefore, the read/write rates, the capacity, and other factors can be varied according to application of data recorded. Therefore, less wasteful recording and reading can be accomplished. Consequently, it is possible to set up the optical drive by taking account of the power consumption and so forth of the drive where it is regarded as a recorder. Thus, an optical drive having excellent portability can be accomplished.

Other objects and features of the invention will appear in the course of the description thereof, which follows.

BRIEF DESCRIPTION OF THE DRAWINGS

FIGS. 13(a)–13(f) and 14(a)–14(e) are cross-sectional views illustrating a process sequence for fabricating the near-field optical head shown in FIG. 11;

DETAILED DESCRIPTION OF THE PREFERRED EMBODIMENTS

Embodiment 1

Figure 1A:
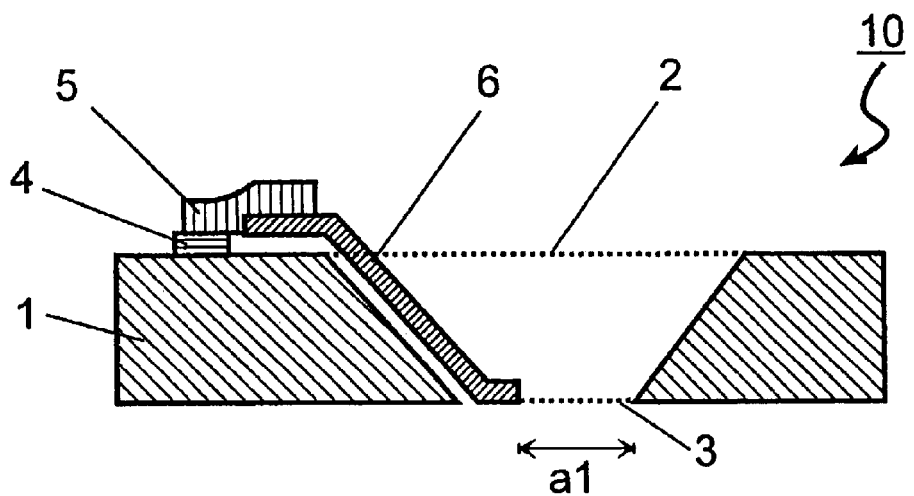
FIG. 1(a) is a cross-sectional view of a near-field optical head in accordance with Embodiment 1 of the present invention.
Figure 1B:
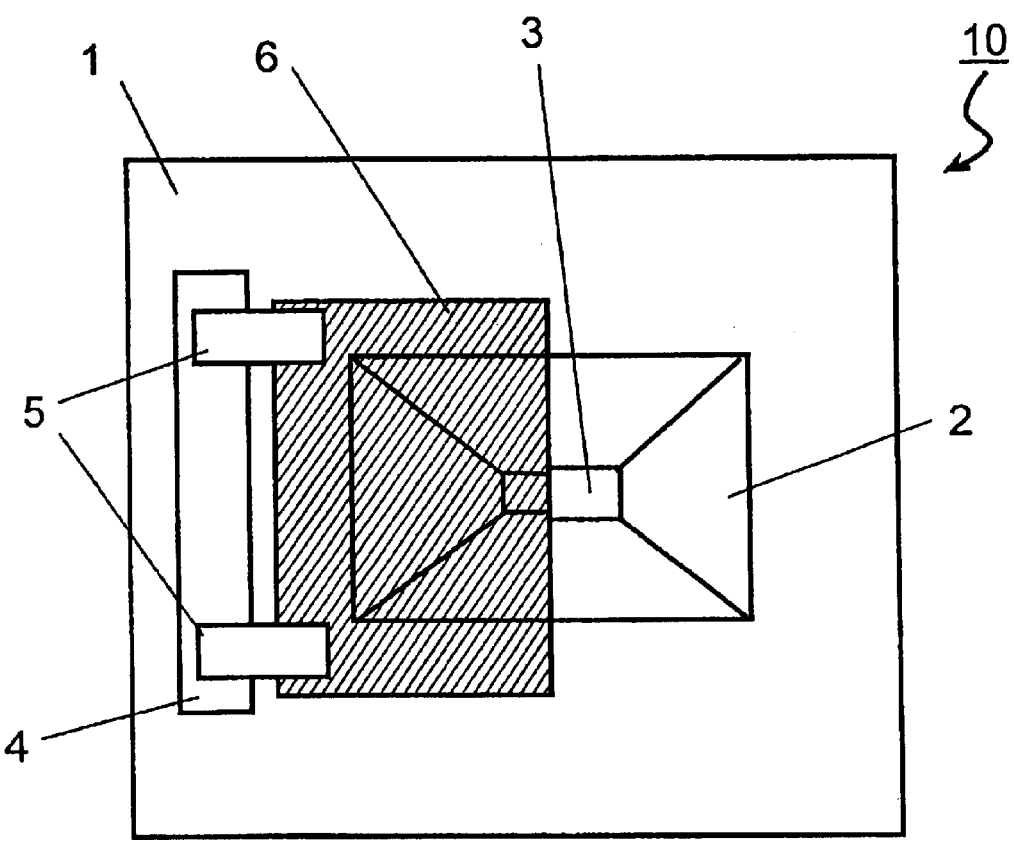
FIG. 1(b) is a plan view of the near-field optical head shown in FIG. 1(a)

Referring to FIGS. 1(a) and 1(b), there is shown a near-field optical head in accordance with Embodiment 1 of the present invention. This head is generally indicated by numeral 10 in these figures. FIG. 1(a) is a cross-sectional view of the head 10. FIG. 1(b) is a top plan view of the head 10. This optical head 10 comprises a substrate 1 made of silicon. The substrate 1 is provided with an inverted conical hole 2. The top portion of this hole 2 forms a microscopic aperture 3 of size a1. A support portion 4 for supporting an actuator 5 is formed on the substrate 1. The actuator 5 holds a light-blocking film 6 in such a way that the film 6 is located inside the hole 2 and that the bottom surface of the film 6 is flush with the bottom surface of the aperture 3. The light-blocking film 6 can be moved by the actuator 5. Therefore, the light-blocking film 6 functions as an aperture-limiting means.

The size a1 of the microscopic aperture 3 is slightly greater than 1 $\mu$m, for example. The light-blocking film 6 consists of chromium, aluminum, or titanium. Otherwise, the film 6 is formed by depositing chromium, aluminum, or titanium on silicon nitride. The actuator 5 is a piezoelectric actuator made of PZT or ZnO or an electrostatic actuator. The maximum amount of movement made by the actuator is 1 $\mu$m, for example. The movement resolution is tens of nanometers, for example.

Figure 2:
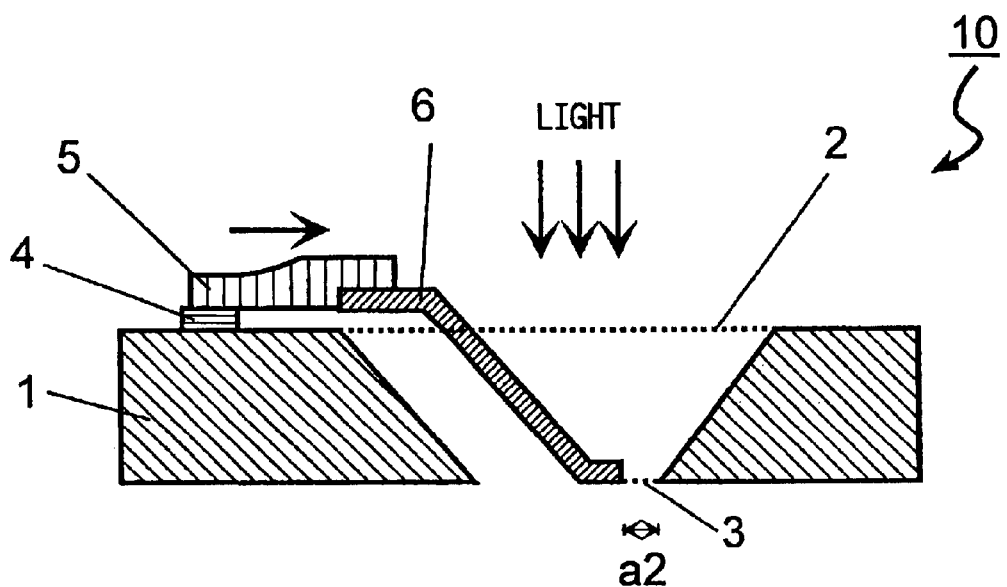
FIG. 2 is a cross-sectional view similar to FIG. 1(a), but in which a microscopic aperture formed in the optical head is modified.

The operation of the near-field optical head 10 is described by referring to FIG. 2. First, the light-blocking film 6 is moved in the direction indicated by the arrow by the actuator 5 to change the microscopic aperture 3 to size a2 (e.g., 100 nm) less than the wavelength of light. Under this condition, propagating light is made to hit the aperture 3. As a result, near-field light is created near the aperture 3 on the opposite side of the illuminated side, because the size a2 of the aperture 3 is less than the wavelength of light. For instance, the propagating light is laser light.

Where the near-field optical head 10 is used as a near-field optical read/write head, near-field light produced near the subwavelength-sized aperture 3 is directed to a recording medium to locally vary the surface structure or material of the medium. Thus, information is recorded. Information is read from the medium by detecting the local change in the surface structure or material of the recording medium. Since the bottom surface of the light-blocking film 6 is flush with the bottom surface of the subwavelength-sized aperture 3, the recording medium can be moved toward the aperture 3.

Because the size of the microscopic aperture 3 in the near-field optical head 10 can be modified, where emphasis is placed on the read and write rates, the size of the microscopic aperture 3 is increased to increase the intensity of the produced near-field light. Where emphasis is placed on the recording density, the size of the aperture 3 can be reduced. Furthermore, signals having higher S/N can be obtained during a reading operation by performing the reading operation with the aperture 3 set smaller than the aperture used during recording. Where a signal is recorded, the size of the aperture 3 is increased to produce intenser near-field light, thus warming up the recording medium. Then, the aperture 3 is reduced in size to produce weaker near-field light, and signal is recorded. As a consequence, recordings can be made at a higher speed and higher density.

Where the near-field optical head 10 is used as a probe head for a scanning near-field microscope, near-field light created near the subwavelength-sized aperture 3 is directed to the surface of a sample, resulting in scattering of the near-field light. This in turn produces propagating light. This propagating light is detected. Thus, the optical characteristics or topography of the sample surface is measured. Since the bottom surface of the light-blocking film 6 is flush with the bottom surface of the microscopic aperture 3, the sample can be brought closer to the aperture 3.

Because the size of the microscopic aperture 3 in the near-field optical head 10 can be varied, a sample surface can be observed at low resolution at low speed by increasing the size of the aperture 3. Furthermore, the size of the aperture 3 is increased, and a desired area on a surface of a sample can be observed at high resolution. Where a large amount of light is necessary, the aperture 3 is increased in size. Where high-resolution observation is necessitated, the size of the aperture 3 is decreased. In this way, the size of the aperture 3 can be changed depending on the object to be observed.

Figure 3A:
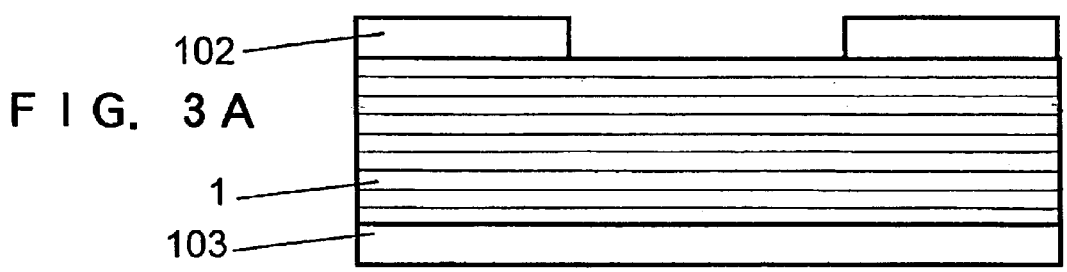
FIGS. 3(a)–3(e) and FIGS. 4(a)–4(e) are cross-sectional views of the near-field optical head shown in FIGS. 1(a), 1(b), and 2, illustrating a process sequence for fabricating the head.
Figure 3B:
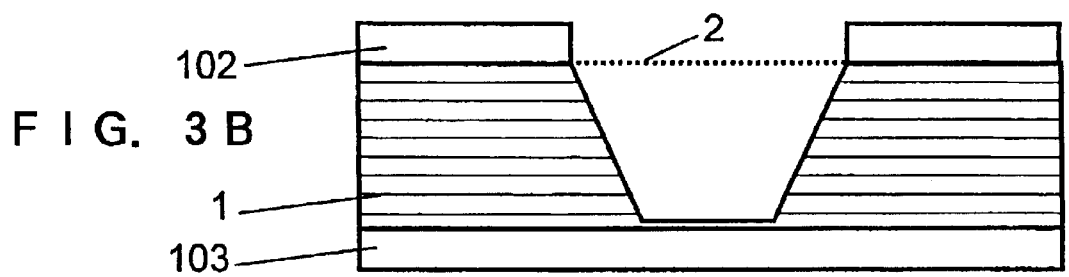

A method of fabricating the near-field optical head 10 is next described by referring to FIGS. 3(a)–3(e) and 4(a)–4(e). First, as shown in FIG. 3(a), the substrate 1 of silicon is prepared. A mask 102 is deposited on one side of the substrate 1. An oxide film 103 is deposited on the other side. The mask 102 is made of silicon dioxide or silicon nitride. The oxide film 103 is made of silicon dioxide. Then, as shown in FIG. 3(b), the hole 2 in the form of an inverted cone is formed in the substrate 1 by anisotropic etching using potassium hydroxide (KOH) or tetramethyl ammonium hydroxide (TMAH).

Figure 3C:
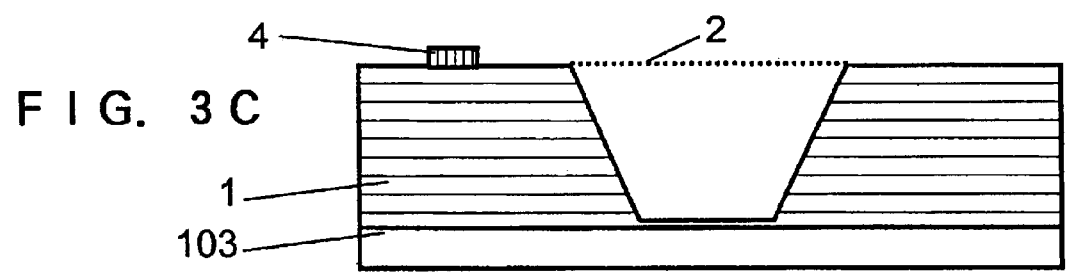
Figure 3D:
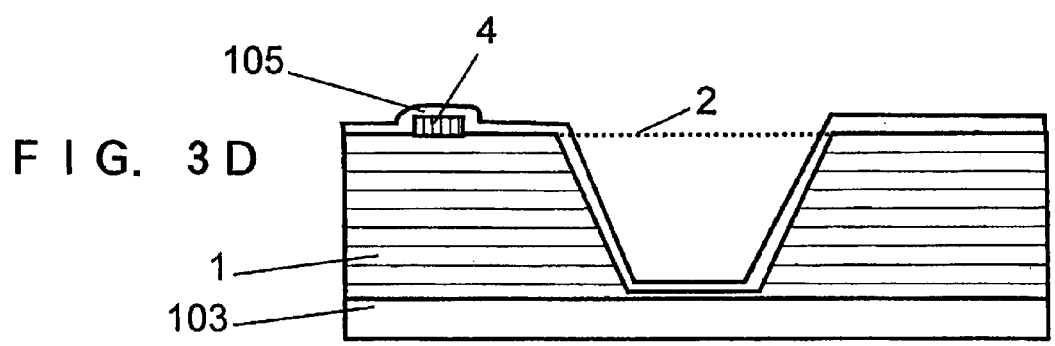
Figure 3E:
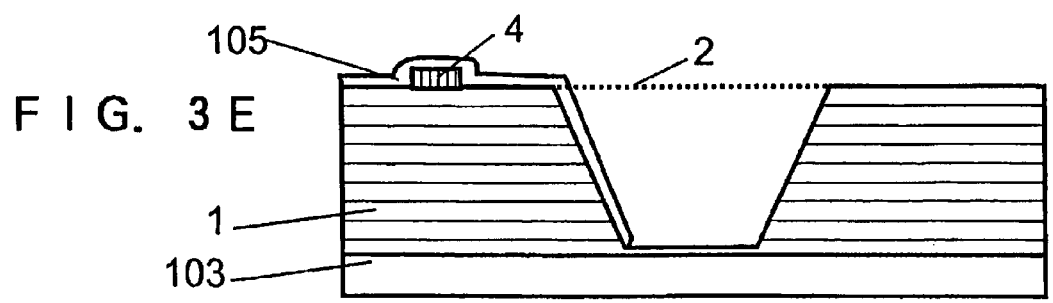

Then, as shown in FIG. 3(c), the mask 102 is removed. The support portion 4 is formed on the substrate 1. The support portion 4 is formed by depositing silicon nitride, amorphous silicon, aluminum, or other material by CVD or sputtering and photolithographically patterning the film. Subsequently, as shown in FIG. 3(d), silicon dioxide, aluminum, chromium, or other material is deposited on the substrate 1 and on the support portion 4 by CVD or sputtering, thus forming a sacrificial film 105. Then, as shown in FIG. 3(e), the sacrificial film 105 is patterned to remove undesired portions of the sacrificial film 105.

Figure 4A:
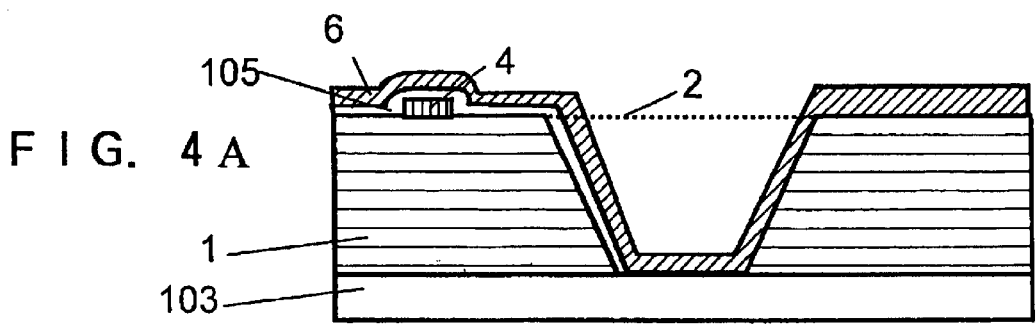
Figure 4B:
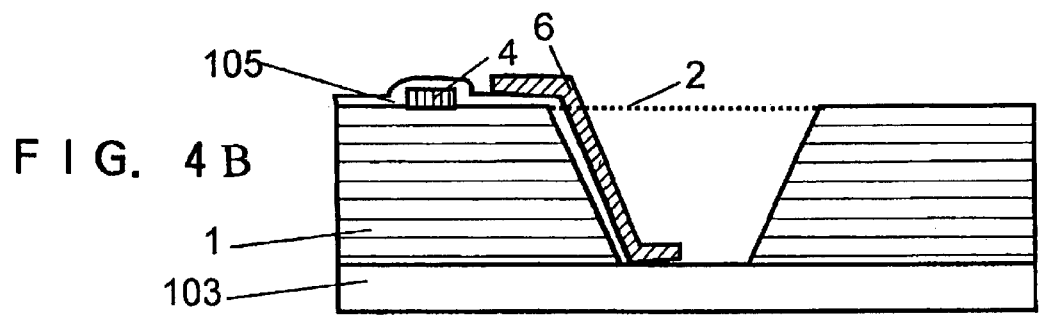
Figure 4C:
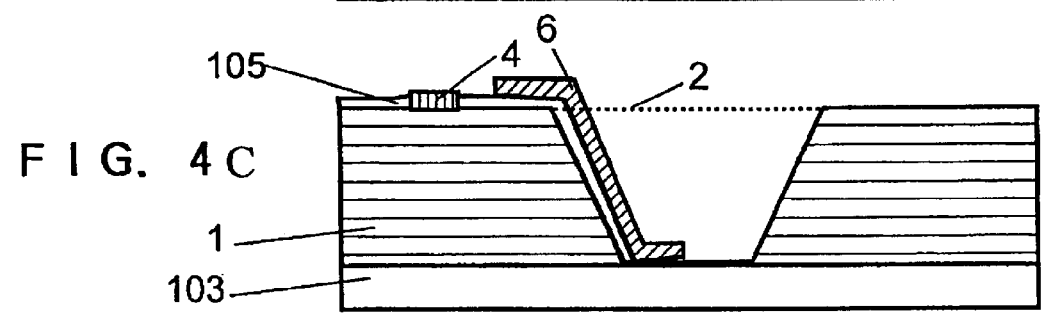

Then, as shown in FIG. 4(a), chromium, aluminum, titanium, or other metal is deposited on the substrate 1 and on the sacrificial film 105 by CVD or sputtering. Alternatively, chromium, aluminum, or other metal is deposited on silicon nitride, and this laminate is deposited on the substrate 1 and on the sacrificial film 105. In this way, a light-blocking film 6 is formed. Then, as shown in FIG. 4(b), the light-blocking film 6 is patterned to remove undesired portions of the film 6. Thereafter, as shown in FIG. 4(c), the sacrificial film 105 on the support portion 4 is etched away, thus exposing the support portion 4.

Figure 4D:
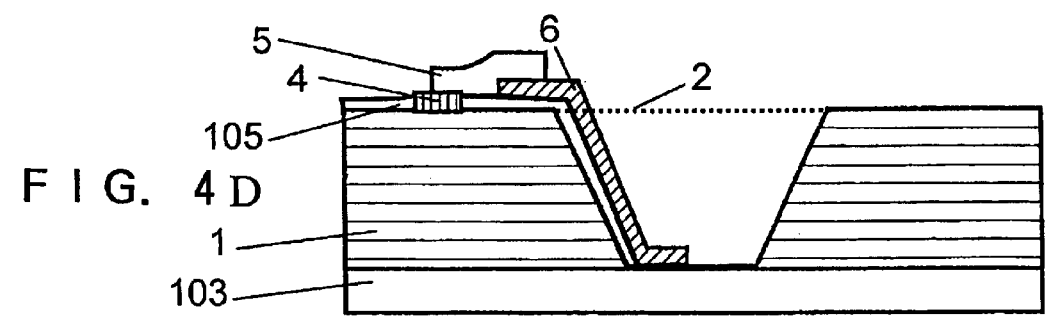

Then, as shown in FIG. 4(d) the actuator S is formed. Where the actuator is a piezoelectric actuator, PZT is adhesively bonded to the support portion 4 and to the light-blocking film 6. Alternatively, a film of PZT is formed, patterned photolithographically, and piezoelectric nature is imparted to the PZT film. Where the actuator is an electrostatic actuator, silicon nitride or amorphous silicon is deposited and photolithographically patterned such that electrodes face each other.

Figure 4E:
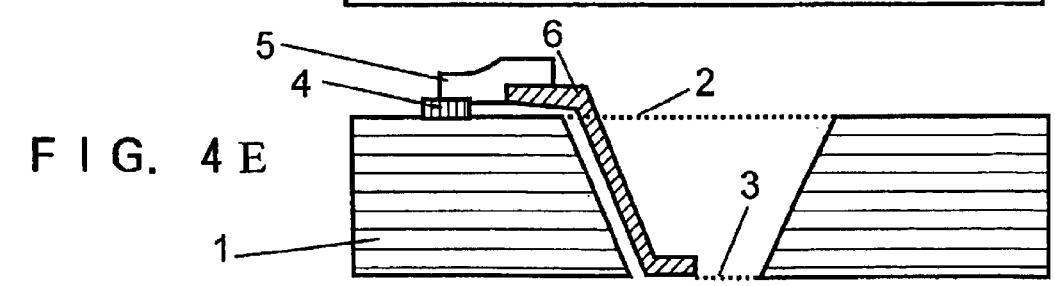

Finally, as shown in FIG. 4(e), the portion of the sacrificial film 105 between the substrate 1 and the light-blocking film 6 is removed by a wet etching process. The oxide film 103 is removed by a wet etching process using buffered HF. In this way, the near-field optical head 10 having the microscopic aperture 3 having variable size is obtained.

In the near-field optical head 10 in accordance with Embodiment 1 described above, the microscopic aperture 3 can be modified to desired size by moving the light-blocking film 6 using the actuator 5. Therefore, where the near-field optical head 10 is utilized as a near-field optical read/write head, it can be operated in two different modes. In one mode, the size of the aperture 3 is increased, and emphasis is placed on the read and write rates. In the other mode, the size of the aperture 3 is reduced, and emphasis is placed on the recording density. On the other hand, where the near-field optical head is used as a probe head for a scanning near-field microscope, it can be operated in two modes. In one mode, the aperture 3 is increased in size, and a sample surface is observed at a low resolution. In the other mode, the aperture 3 is reduced in size, and a sample surface is observed at a high resolution.

With the method of fabricating a near-field optical head in accordance with Embodiment 1 described above, the near-field optical head 10 in which the microscopic aperture 3 can be modified to desired size by moving the light-blocking film 6 using the actuator 5 can be easily fabricated.

Embodiment 2

Figure 5:
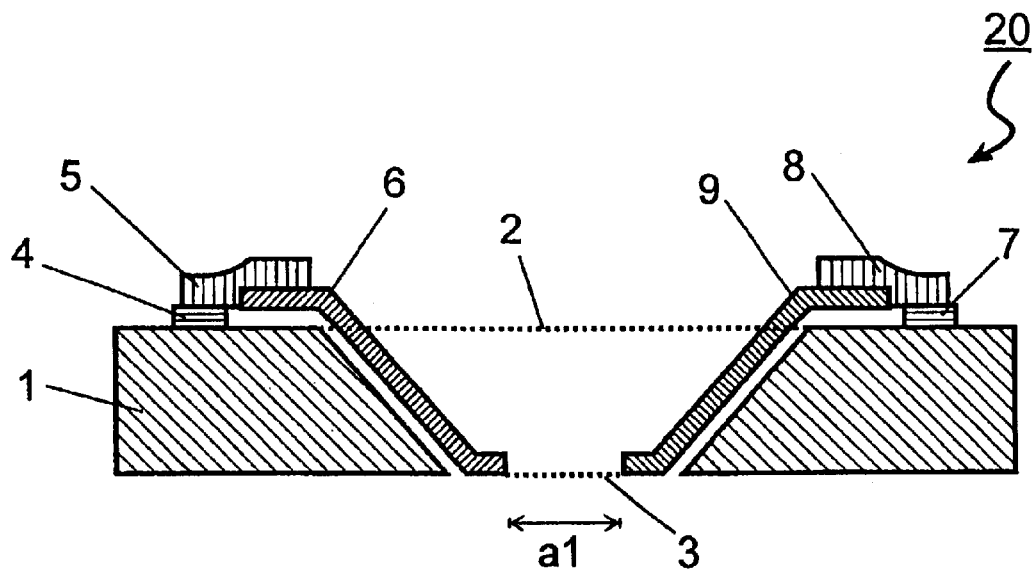
FIG. 5 is a cross-sectional view of a near-field optical head in accordance with Embodiment 2 of the present invention.

FIG. 5 is a cross-sectional view of a near-field optical head in accordance with Embodiment 2 of the invention. In this figure, the optical head is generally indicated by numeral 20. In this head 20, a first light-blocking film 6 and a second light-blocking film 9 are located symmetrically with respect to a microscopic aperture 3. The first light-blocking film 6 is held by a first support portion 4 so that it can be moved by a first actuator 5. The second light-blocking film 9 is held by a second support portion 7 so that it can be moved by a second actuator 8. Therefore, the light-blocking films 6 and 9 act as aperture-limiting means. This near-field optical head 20 is fabricated by the same method as used to fabricate the near-field optical head 10 in accordance with Embodiment 1 already described.

Figure 6:
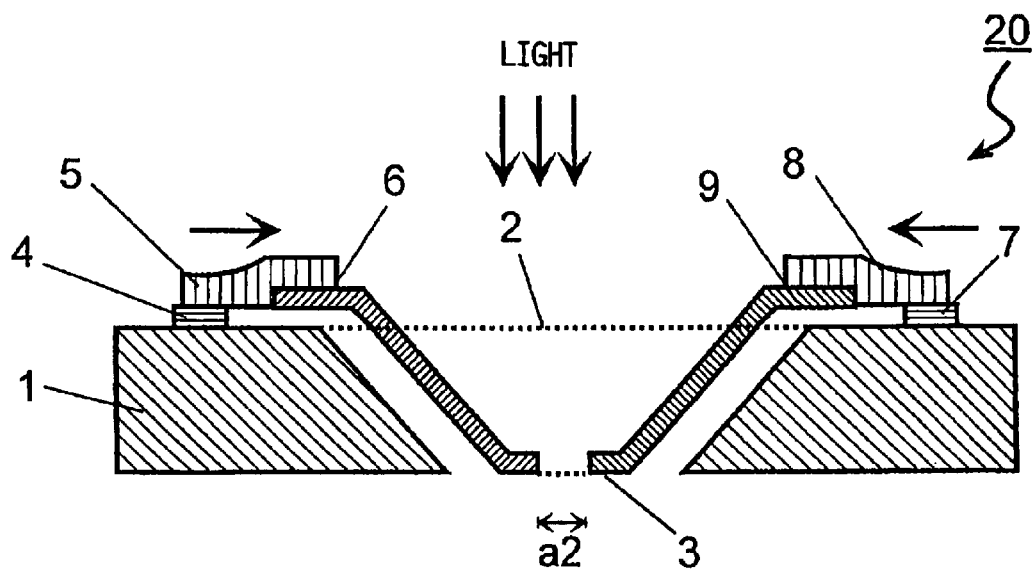
FIG. 6 is a cross-sectional view similar to FIG. 5, but in which a microscopic aperture formed in the optical head is modified.

The operation of the near-field optical head 20 is next described by referring to FIG. 6. First, the light-blocking films 6 and 9 are moved by the actuators 5 and 8, respectively, so that the two films move toward each other. In this way, the microscopic aperture 3 is modified to size a2 less than the wavelength of light. For example, a2 is 100 nm. Under this condition, propagating light is made to impinge on the subwavelength-sized aperture 3, near-field light is produced near the aperture 3 and on the opposite side of the illuminated side. This optical head 20 can be used as a near-field optical read/write head and as a probe head for a scanning near-field microscope in the same way as the near-field optical head 10 in accordance with Embodiment 1.

In the near-field optical head 20 in accordance with Embodiment 2 described above, the light-blocking film 6 is moved by the actuator 5. The light-blocking film 9 is moved by the actuator 8. Hence, the microscopic aperture 3 can be changed to a desired size. Furthermore, the two actuators 5 and 8 are driven in synchronism while maintaining the distance between the light-blocking films 6 and 9. In this manner, the microscopic aperture can be moved without moving the head, and tracking is done. Accordingly, it is not necessary to move the heavy head assembly during reading of signals. In consequence, high-speed and accurate positioning is enabled.

Embodiment 3

Figure 7:
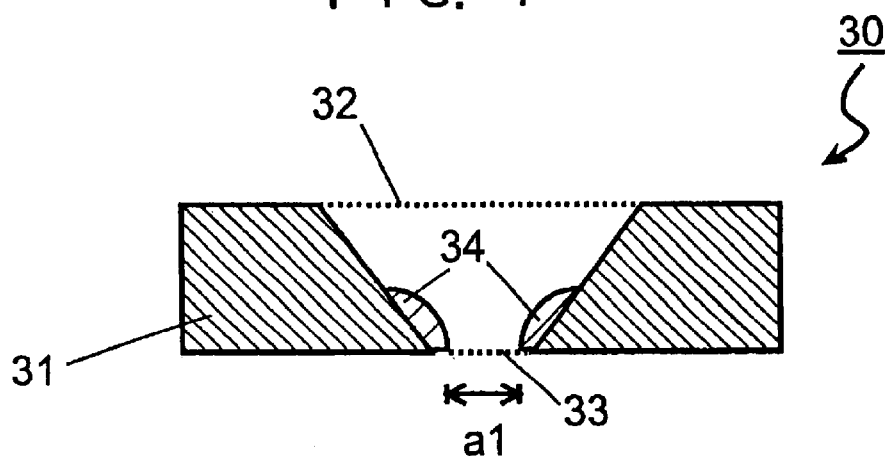
FIG. 7 is a cross-sectional view of a near-field optical head in accordance with Embodiment 3 of the present invention.

FIG. 7 is a cross-sectional view of a near-field optical head in accordance with Embodiment 3 of the invention. In this figure, the optical head is generally indicated by numeral 30. This head 30 comprises a substrate 31 of silicon. The substrate 31 is provided with a hole 32 in the form of an inverted cone. The top portion of the hole 32 forms a microscopic aperture 33 of size a1. A thermally expansible body 34 is deposited inside the hole 32. The thermally expansible body 34 is made of a material having a high coefficient of thermal expansion such as polyimide or Teflon, and expands on heating. Therefore, the thermally expansible body 34 functions as an aperture-limiting means.

Figure 8:
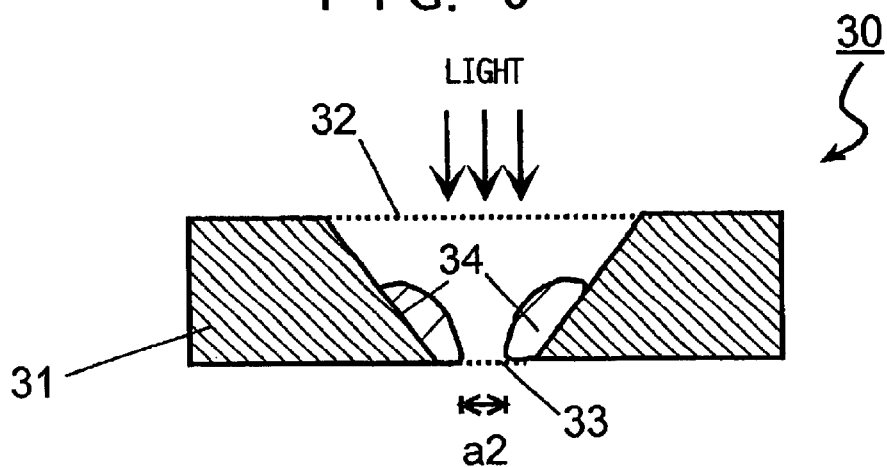
FIG. 8 is a cross-sectional view similar to FIG. 7, but in which a microscopic aperture formed in the optical head is modified.
Figure 9:
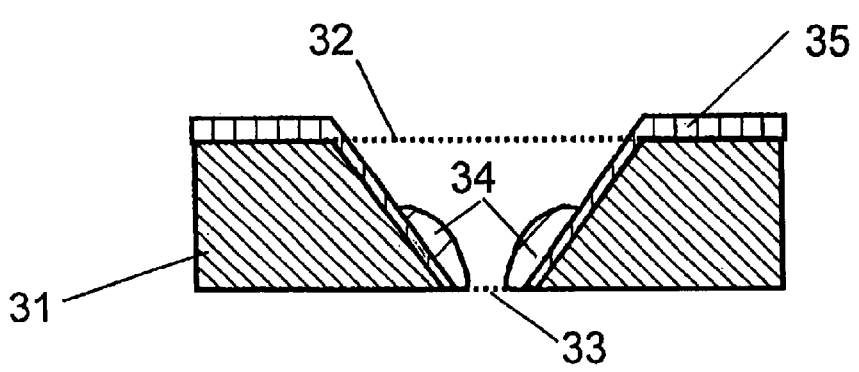
FIG. 9 is a cross-sectional view similar to FIG. 7, but in which electrical resistors are added.

The operation of the near-field optical head 30 is next described by referring to FIG. 8. First, the thermally expansible body 34 is heated and expanded to modify the microscopic aperture 33 to the size a2 (e.g., 100 nm) that is less than the wavelength of light. The thermally expansible body 34 may be heated by directing propagating light to the body. Alternatively, as shown in FIG. 9, a voltage is applied to an electrical resistor 35 formed between the thermally expansible body 34 and the substrate 31 to cause the resistor 35 to produce heat by the Joule effect. Under this condition, if propagating light is made to hit the subwavelength-sized aperture 33 of size a2, near-field light is produced near the aperture 33 and on the opposite side of the illuminated side This optical head 30 can be used as a near-field optical read/write head and as a probe head for a scanning near-field microscope, in the same way as the near-field optical head 10 in accordance with Embodiment 1.

Figure 10A:
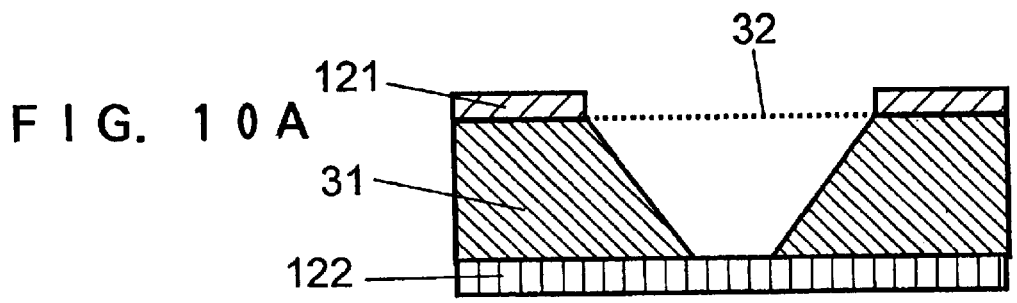
FIGS. 10(a)–10(d) are cross-sectional views illustrating a process sequence for fabricating the near-field optical head shown in FIG. 7.
Figure 10B:
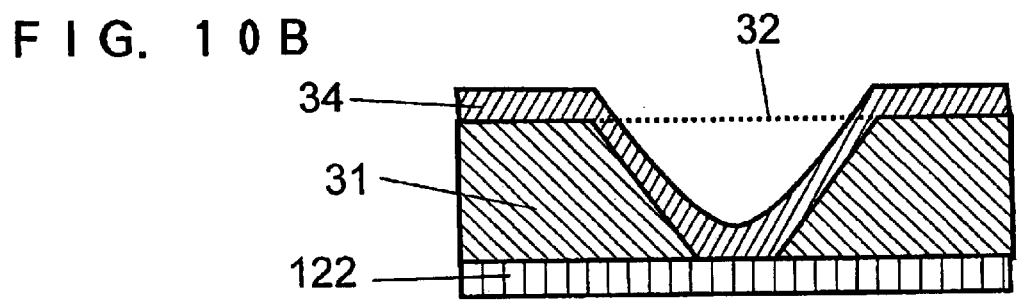

A method of fabricating the near-field optical head 30 is described by referring to FIGS. 10(a)–10(d). First, the substrate 31 of silicon is prepared as shown in FIG. 10(a). An oxide film 122 is deposited on one side of the substrate 31, and a mask 121 is formed on the other side. The hole 32 in the form of an inverted cone is formed in the substrate 31 by anisotropic etching using KOH or TMAH. The oxide film 122 is made of silicon oxide. The mask 121 is made of silicon dioxide or silicon nitride. After removing the mask 121, the thermally expansible body 34 of polyimide or Teflon is deposited on the substrate 31 by spin coating or spray coating, as shown in FIG. 10(b).

Figure 10C:
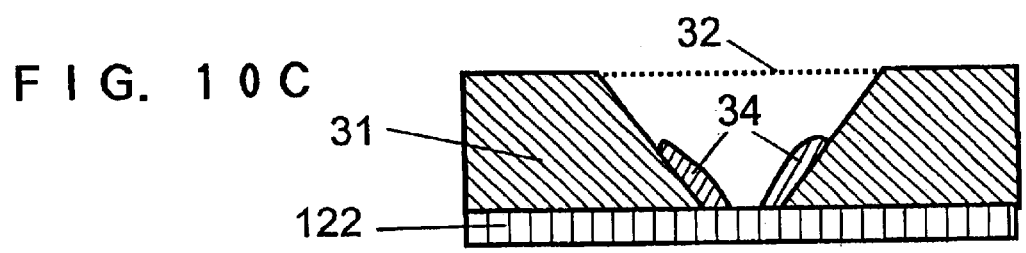
Figure 10D:
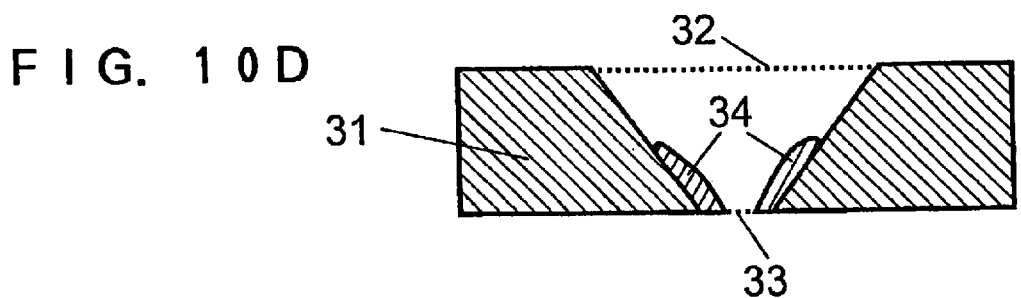

Then, as shown in FIG. 10(c), the thermally expansible body 34 is patterned to remove it except for the portion of the body 34 located in the hole 32. Finally, as shown in FIG. 10(d), the oxide film 122 is etched away by a wet etching process using buffered HP. As a result, the near-field optical head 30 having the microscopic aperture 33 having variable size is obtained.

In this way, in the near-field optical head 30 in accordance with Embodiment 3 described above, the microscopic aperture 33 can be changed to desired size by heating the thermally expansible body 34 inside the hole 32 to expand it. Hence, the near-field optical head 30 yields the same advantages as the near-field optical head 10 in accordance with Embodiment 1.

With the method of fabricating the near-field optical head in accordance with Embodiment 3 described above, it is easy to fabricate the near-field optical head 30 having the microscopic aperture 33 that can be changed to desired size by heating the thermally expansible body 34 inside the hole 32 to expand it.

Embodiment 4

Figure 11:
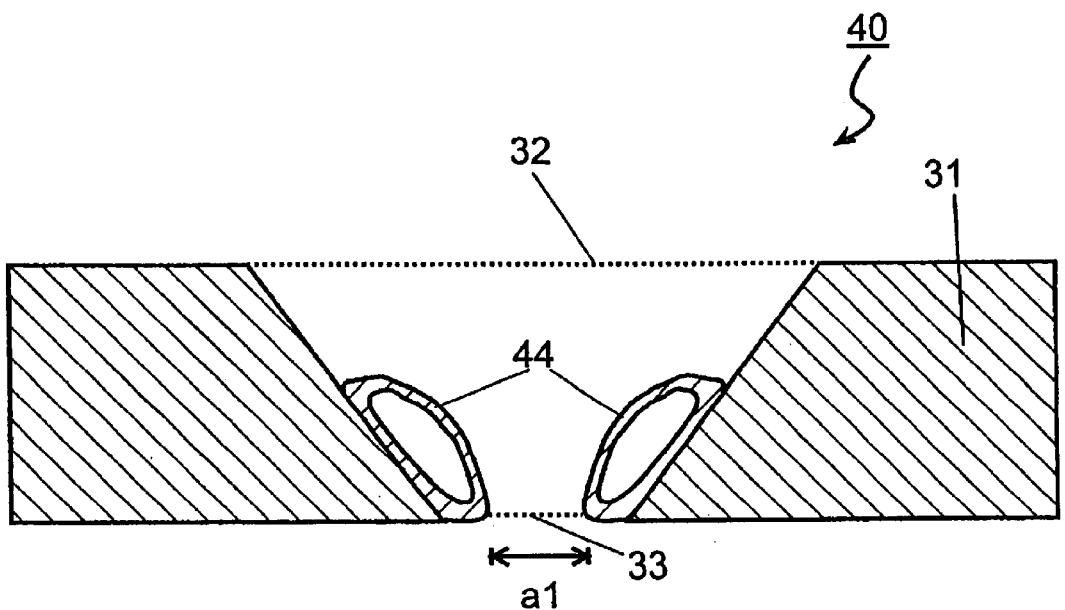
FIG. 11 is a cross-sectional view of a near-field optical head in accordance with Embodiment 4 of the invention.

FIG. 11 is a cross-sectional view of a near-field optical head in accordance with Embodiment 4 of the invention. In this figure, the near-field optical head is generally indicated by numeral 40. This head 40 comprises a substrate 31 provided with a hole 32 in the form of an inverted cone. A thermally expansible body 44 is deposited inside the hole 32, and is made of a material having a high coefficient of thermal expansion such as polyimide or Teflon. The body 44 has a hollow portion filled with a gas such as air, nitrogen, or argon. When the thermally expansible body 44 is heated, the gas in the hollow portion expands. Therefore, the thermally expansible body 44 acts as an aperture-limiting means. The thermally expansible body 44 can be heated by the method described in Embodiment 3.

Figure 12:
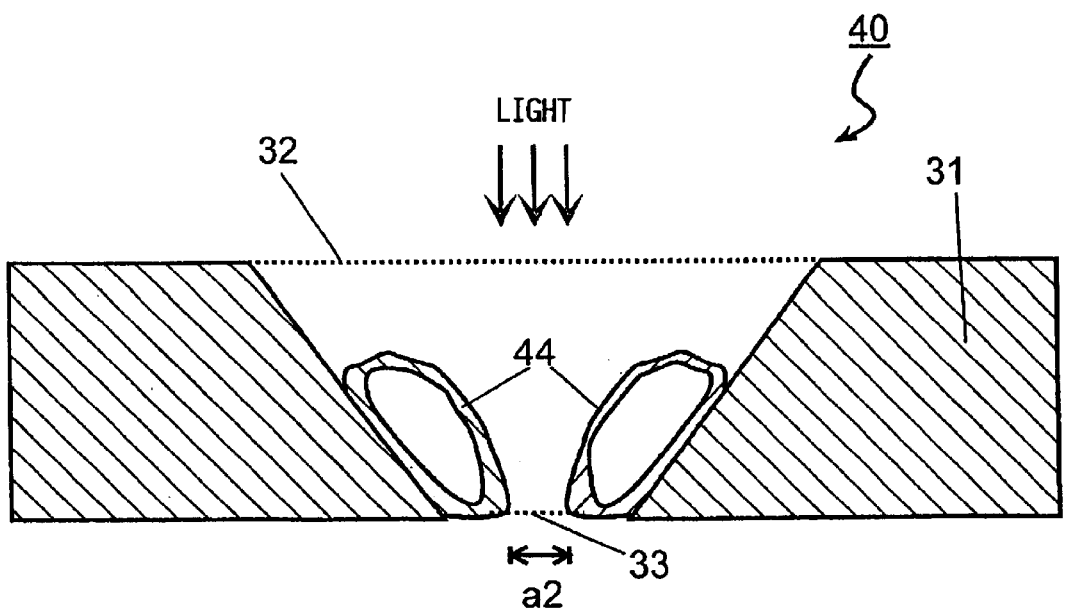
FIG. 12 is a cross-sectional view similar to FIG. 11, but in which a microscopic aperture formed in the optical head is modified.

The operation of the near-field optical head 40 is described by referring to FIG. 12. First, the thermally expansible body 44 is heated to expand it. Thus, the microscopic aperture 33 is changed to size a2 (e.g., 100 nm) less than the wavelength of light. Under this condition, if propagating light is made to hit the subwavelength-sized aperture 33 having size a2, near-field light is produced near the aperture 33 and on the opposite side of the illuminated side. This near-field optical head 40 can be used as a near-field optical read/write head and as a probe head for a scanning near-field microscope in the same manner as the near-field optical head 10 in accordance with Embodiment 1.

A method of fabricating the near-field optical head 40 described above is next described by referring to FIGS. 13(a)–13(f) and 14(a)–14(e). First, as shown in FIG. 13(a), the substrate 31 of silicon is prepared. The oxide film 122 is deposited on one side of the substrate 31. The mask 121 is formed on the other side. The inverted conical hole 32 is formed in the substrate 31 by anisotropic etching using KOH or TMAH. The oxide film 122 is made of silicon dioxide, while the mask 121 is made of silicon dioxide or silicon nitride. The mask 121 is removed, and then the thermally expansible body 123 is deposited on the substrate 31 of polyimide or Teflon by spin coating or spray coating, as shown in FIG. 13(b).

Then, as shown in FIG. 13(c), silicon dioxide, aluminum, chromium, or the like is deposited on the thermally expansible body 123 by CVD or sputtering to form a sacrificial film 124. Then, as shown in FIG. 13(d), the sacrificial film 124 is patterned to remove it except for the portion located in the hole 32. Thereafter, as shown in FIG. 13(e), a thermally expansible body 125 of polyimide or Teflon is deposited on the thermally expansible body 123 and on the sacrificial film 124 by spin coating or spray coating. Subsequently, as shown in FIG. 13(f), the thermally expansible body 125 is patterned to remove it except for the portion lying on the sacrificial film 124.

Figure 14A:
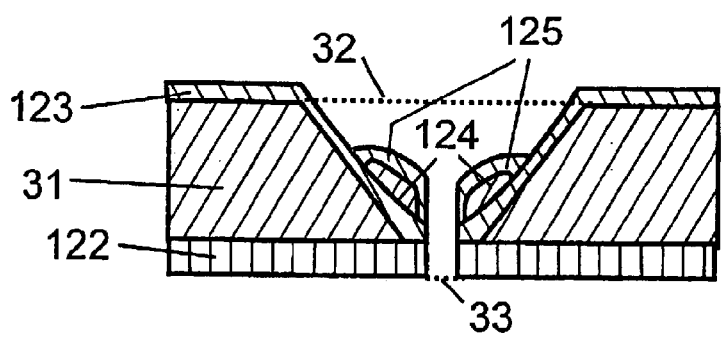
Figure 14B:
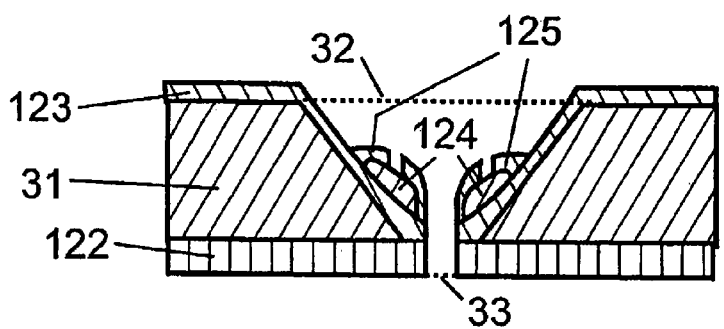

Then, as shown in FIG. 14(a), the thermally expansible bodies 123, 125 and the sacrificial film 124 are etched away by a wet etching process or dry etching process. The oxide film 122 is etched away by a wet etching process using buffered HF to form the microscopic aperture 33. Then, as shown in FIG. 14(b), a hole 126 is formed in the thermally expansible body 125 that covers the sacrificial film 124 by dry etching or laser processing.

Figure 14C:
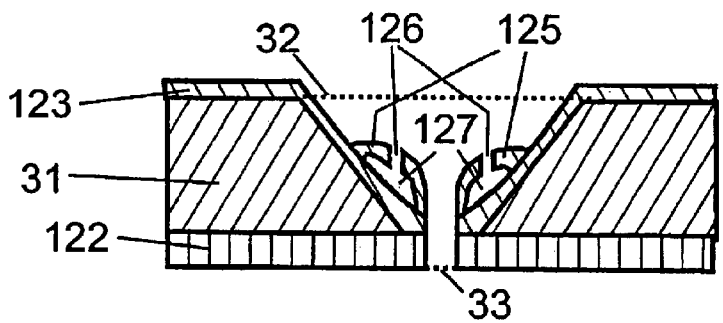
Figure 14D:
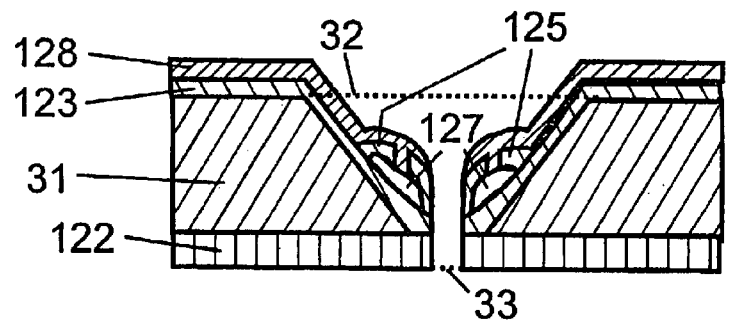
Figure 14E:
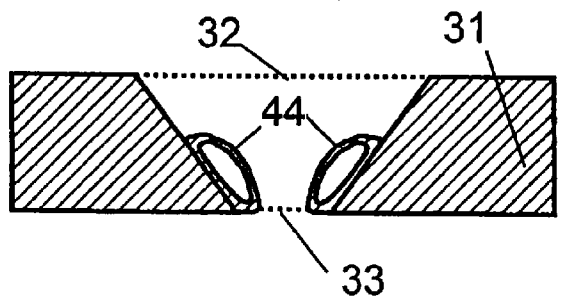
Figure 15A:
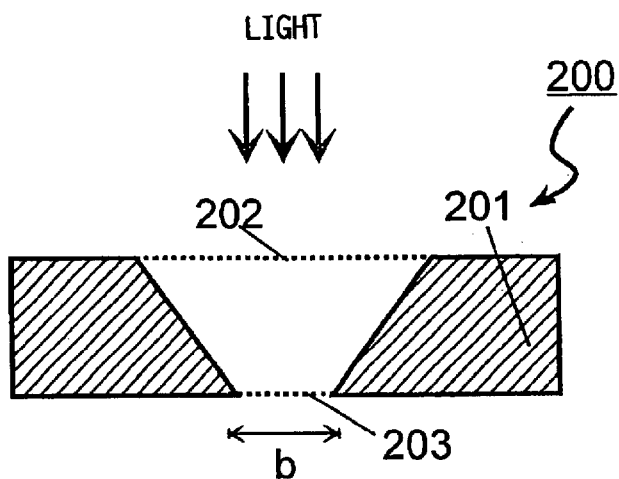
FIG. 15(a) is a cross-sectional view of a conventional near-field optical head.
Figure 15B:
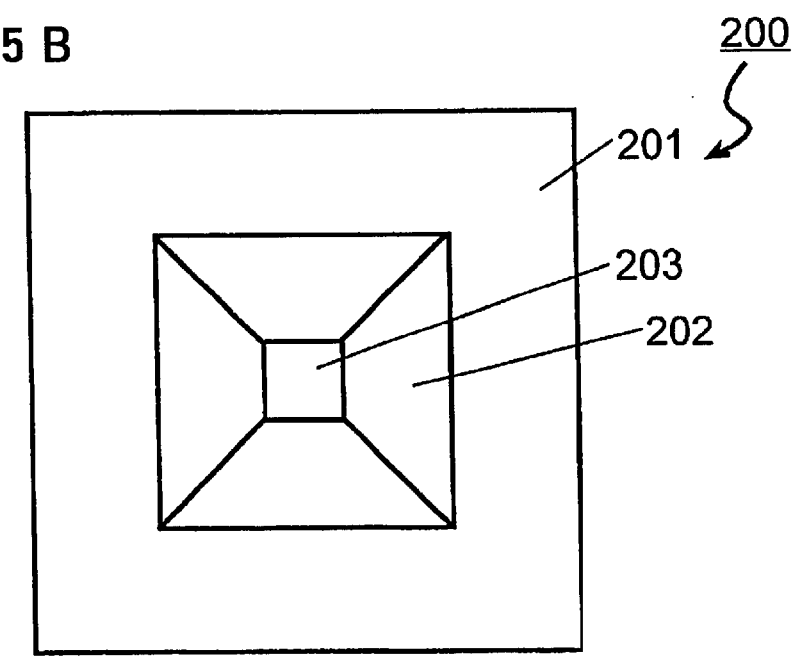
FIG. 15(b) is a plan view of the conventional near-field optical head shown in FIG. 15(a)

Then, as shown in FIG. 14(c), the sacrificial film 124 is removed by wet etching using the hole 126, thus forming a hollow portion 127. Then, a thermally expansible body 128 is deposited by dipping or other method within an ambient of a gas such as air, nitrogen, or argon to clog up the hole 126 as shown in FIG. 14(d). The gas such as air, nitrogen, or argon is sealed in the hollow portion 127 by this process step. Finally, as shown in FIG. 14(e), the undesired portion of the thermally expansible body 128 is removed. Consequently, a thermally expansible body 44 having a hollow portion sealed with a gas having a high coefficient of thermal expansion is formed. In this way, the near-field optical head 40 having the microscopic aperture 33 of variable size is obtained.

In the near-field optical head 40 in accordance with Embodiment 4 described above, the thermally expansible body 44 inside the hole 32 is heated and expanded to modify the microscopic aperture 33 to desired size. The same advantages as produced by the near-field optical head 10 in accordance with Embodiment 1 can be obtained with simpler configuration.

With the method of fabricating the near-field optical head in accordance with Embodiment 4 described above, it is easy to fabricate the near-field optical head 40 having the microscopic aperture 33 that can be varied to desired size by heating the thermally expansible body 44 inside the hole 32 to expand the body.

Embodiment 5

Figure 16:
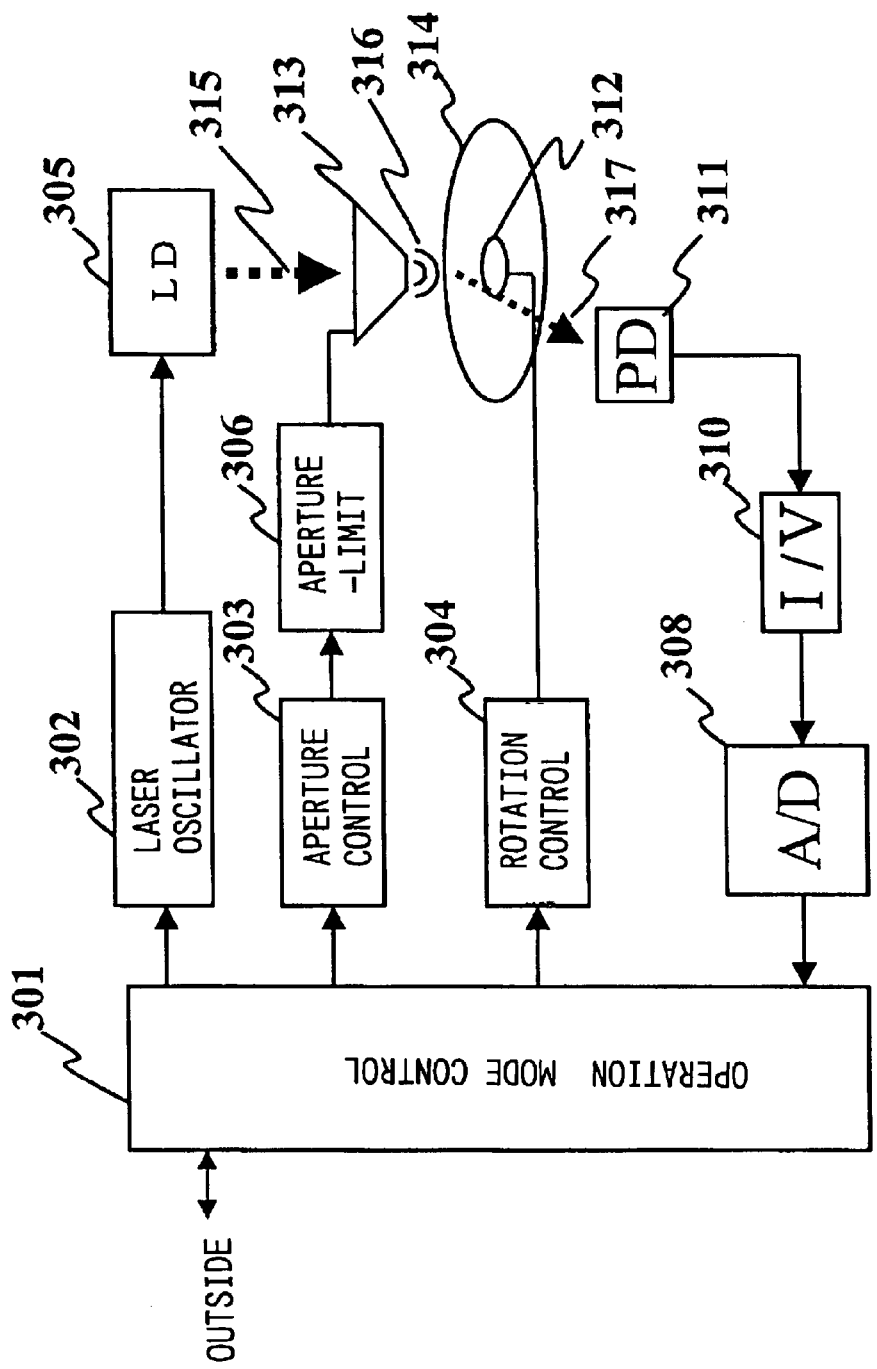
FIG. 16 is a block diagram of an optical drive in accordance with Embodiment 5 of the invention.

FIG. 16 is a block diagram of an optical drive in accordance with Embodiment 5 of the present invention. This drive is similar in fundamental structure with the prior art magnetic disk drive, and comprises a recording medium 314, a spindle motor 312 for rotating the recording medium 314, and a read/write head (not shown). In the present invention, a near-field optical head as set forth in Embodiments 1–4 is used as this read/write head.

The amount of data to be recorded by an external user (not shown in FIG. 16) via a microcomputer such as a personal computer, data transfer rate, power consumption, and so on become use environments. At this time, the use environment takes various forms, depending on (i) where only a small storage capacity is necessary but data are recorded and read at high speeds, (ii) where emphasis is placed on the storage capacity although the data read/write rates are slow, or (iii) where emphasis is placed on the power consumption rather than recording rate and capacity.

An operation mode control circuit 301 determines the size of the microscopic aperture on the near-field optical head according to the given use environments and operates to optimize the rotational speed of the recording medium.

Where emphasis is placed on the speed of recording or reading, the optimization is to increase the size of the microscopic aperture, for increasing the intensity of the generated near-field light. Where emphasis is placed on the recording density, the optimization is to reduce the size of the microscopic aperture. The number of sizes that the microscopic aperture can assume is not limited to two, i.e., larger one and smaller one. An optimum value can be selected from successively distributed values. During a reading operation, a signal with high S/N can be,obtained by performing or the reading operation with the microscopic or ultraminiature aperture set smaller than the aperture used at the time of recording.

Information about the determined aperture size and information about the rotational speed are sent to an aperture control circuit 303 and to a rotation control circuit 304. The control circuit 303 varies the size of the aperture by means of an aperture-limiting means 306. The rotation control circuit 304 operates to supply an input signal to the spindle motor 312 of known construction.

In a laser oscillator circuit 302, an LD 305 that is a light source for emitting light incident on the ultraminiature aperture 313 on the near-field optical head is controlled such that the amount of near-field light is regulated. Depending on the mode of operation, the amount of light can be made variable. The LD 305 can be built using a well-known semiconductor laser or the like.

The incident light 315 emitted from the LD 305 is made to enter the ultraminiature aperture 313 on the near-field optical head, which in turn produces near-field light 316. Scattered light 317 is transmitted through the data pits on the recording medium 314 and converted into an electrical signal by a PD 311 that is a photoelectric device. Thus, a playback signal is derived. In this embodiment, a well-known PIN diode, APD (avalanche photodiode), or other semiconductor photoelectric device is used as the PD 311.

Since the playback signal produced from the PD 311 is a current signal, it is converted into a voltage signal by an I/V (current-to-voltage) amplifier 310 and then converted into digital form by an A/D converter 308. The digitized playback signal is once returned to the operation mode control circuit and fed back as control signals to the laser oscillator circuit 302, aperture control circuit 303, and rotational speed control circuit 304.

It is obvious that the playback signal is fed to an interface I/F circuit (not shown) to send the signal to an external host computer.

Figure 17:
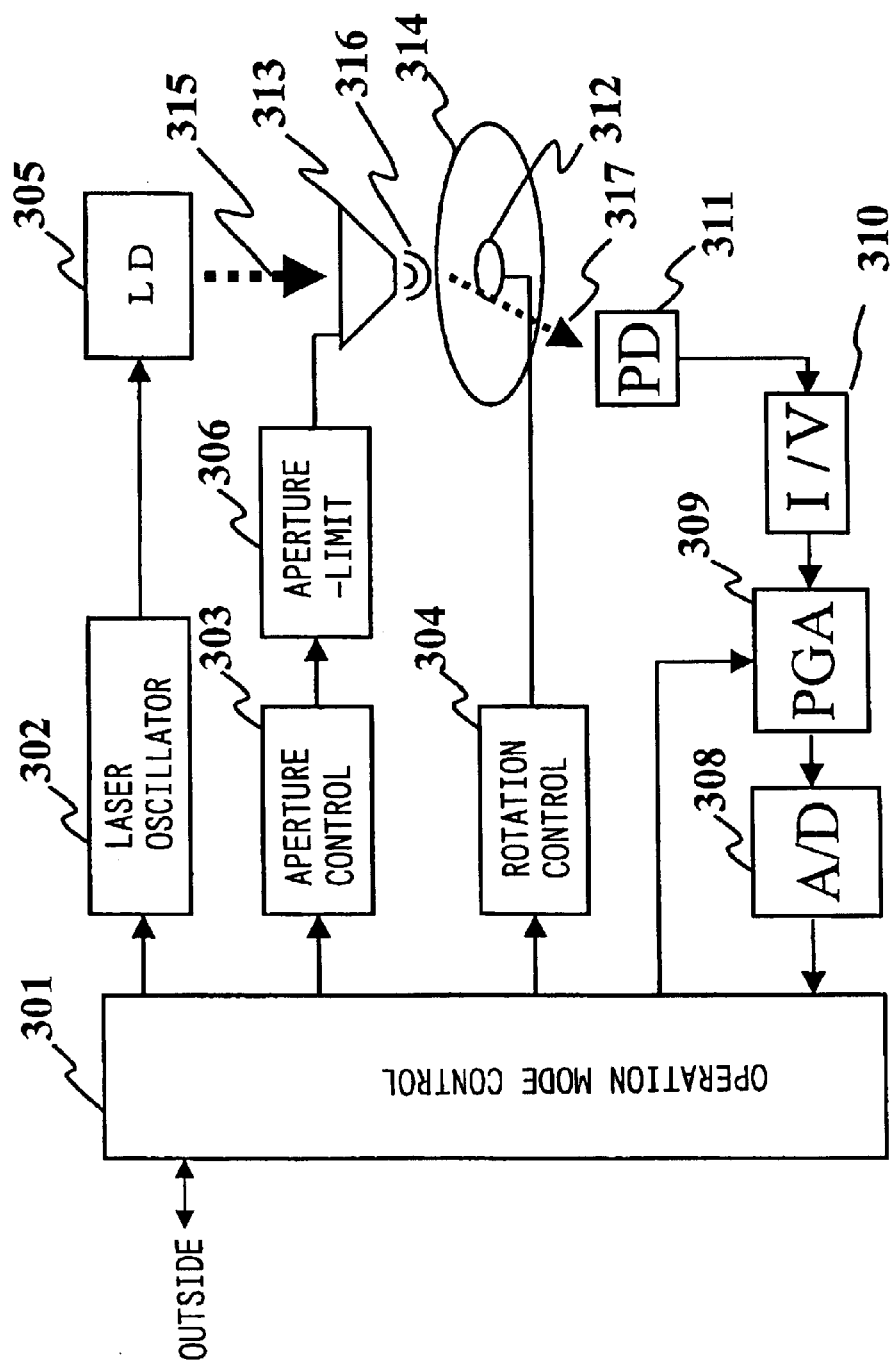
FIG. 17 is a block diagram similar to FIG. 16, but in which a PGA 309 is added.

As shown in FIG. 17, a programmable gain amplifier (PGA) 309 under control of the operation mode control circuit 301 is added between the I/V amplifier 310 and the A/D converter 308 to control the mode of operation. In this way, the playback signal can be amplified optimally.

Where a portable storage medium such as a removable storage device is assumed, data storage capacity and data transfer rate are preset for each individual recording medium. Information about them is stored in a part of a data region or other means is adopted to cause the operation mode control circuit 301 to recognize the information. In this way, recording and reading can be done according to the application.

As described thus far, in a near-field optical head set forth in one aspect of the invention, an aperture-limiting means positioned inside a hole formed in a substrate is moved to limit the size of the microscopic hole. Therefore, the microscopic hole can be modified to desired size. As a result, where the near-field optical head is used as a near-field optical read/write head, it can be operated in two modes. In one mode, emphasis is put on the read and write rates. In the other mode, emphasis is placed on the recording density. Where the near-field optical head is used as a probe head for a scanning near-field microscope, a sample surface can be observed at a high resolution and at a low resolution with the single head.

In a near-field optical head set forth in another aspect, a pair of aperture-limiting means are positioned inside a microscopic hole formed in a substrate. The aperture can be modified to a, desired size by moving the aperture-limiting means by their respective moving means. Furthermore, the microscopic aperture can be moved without moving the head by driving actuators in synchronism while maintaining the distance between the aperture-limiting means, and tracking can be done. Therefore, during reading of signals, it is not necessary to move the whole head assembly that is heavy. Hence, high-speed, accurate positioning is accomplished.

In a near-field optical head set forth in another aspect, the bottom surface of the aperture-limiting means is flush with the bottom surface of the microscopic aperture. Therefore, a recording medium or a sample can be moved toward the microscopic aperture. This increases the intensity of near-field light impinging on the recording medium or on the sample.

In a near-field optical head set forth in another aspect, a piezoelectric or electrostatic actuator is used to move the aperture-limiting means and so the microscopic aperture can be modified to desired size easily and accurately.

In a near-field optical head set forth in another aspect, an aperture-limiting means that expands on heating is positioned inside the hole formed in the substrate. The microscopic aperture can be changed to desired size by expanding the aperture-limiting means.

In a near-field optical head set forth in another aspect, a heating means is provided to heat the aperture-limiting means. Therefore, the aperture-limiting means can be expanded easily and accurately. The microscopic aperture can be changed to desired size.

In a near-field optical head set forth in another aspect, the aperture-limiting means consists of a high polymer having a high coefficient of thermal expansion or a high polymer sealed with a gas. Therefore, the aperture-limiting means can be expanded with a small amount of heat efficiently. The microscopic aperture can be modified to a desired size.

In a method of fabricating a near-field optical head in another aspect, a hole is formed in a substrate. A support means is deposited on the substrate. A sacrificial film is deposited on the substrate and on the support means. A light-blocking film is deposited on the sacrificial film and patterned to form an aperture-limiting means. The support means is exposed. A moving means is formed on the support means. Finally, the sacrificial film is removed except for the portion located inside the hole. Hence, the aperture-limiting means capable of being moved by the moving means can be obtained inside the hole. The microscopic aperture can be changed to a desired size by moving the aperture-limiting means by means of the moving means.

In a method of fabricating a near-field optical head in another aspect, the aperture-limiting means is moved using a piezoelectric or electrostatic actuator. Therefore, the aperture-limiting means can be moved easily and precisely. As a consequence, the microscopic aperture can be changed to desired size.

In a method of fabricating a near-field optical head in another aspect, a hole is formed in a substrate. A film of a high polymer having a high coefficient of thermal expansion is deposited inside the hole. The film of the high polymer is patterned to form an aperture-limiting means. Therefore, the aperture-limiting means that expands on heating can be formed inside the hole. The microscopic aperture can be changed to desired size by expanding the aperture-limiting means.

In a method of fabricating a near-field optical head in another aspect, a hole is formed in a substrate. A first film of a high polymer is deposited inside the hole. A sacrificial film is deposited on the first film and patterned. A second film of a high polymer is deposited on the sacrificial film. A hole is formed in the second film. The portion of the sacrificial layer sandwiched between the first and second films is removed using the hole. Thus, a hollow portion is formed. A gas is injected into the hollow portion. A high polymer is deposited to close off the hole in the second film. Consequently, the gas is sealed in the hollow portion. An aperture-limiting means that expands on heating can be formed. The microscopic hole can be changed to desired size by expanding the aperture-limiting means.

An optical drive in another aspect is an optical drive having a near-field optical head equipped with a substrate provided with a hole whose top portion forms a microscopic aperture, the optical drive acting to record and/or read information to and from a recording medium. An aperture control means has an aperture-limiting means located inside the aperture and having a moving means for moving the aperture-limiting means to limit the size of the microscopic aperture by moving the aperture-limiting means. A rotational speed control means for controlling the rotational speed of the recording medium is provided. The optical drive further includes an operation mode control means for determining the combination of a data transfer rate and a recording density. Therefore, the read/write rates, the capacity, and other factors can be varied according to application of data recorded. Hence, less wasteful recording and reading can be done.

Furthermore, it is possible to set up the optical drive by taking account of the power consumption and so forth of the drive where it is regarded as a recorder. Therefore, an optical drive having excellent portability can be accomplished.

An optical drive in another aspect is based on the optical drive set forth in above and further characterized in that the data transfer rate and the recording density can be selected from values distributed successively within a range defined by preset upper limit value and lower limit value. Therefore, the read/write rates, the capacity, and so on can be varied continuously according to the application of data recorded. In consequence, optimum recording and reading can be done for various applications.

An optical drive in another aspect is based on the optical drive set forth in above and further characterized in that the aperture-limiting means and rotational speed control means are operated according to the combination of the data transfer rate and the recording density determined by the operation mode control means. Therefore, the size of the aperture on the near-field optical head and the read/write rates that are important for recording and reading can be varied simultaneously. Therefore, the read/write rates, the capacity, and other factors can be varied according to the application of recorded data. Less wasteful recording and reading can be done.

In addition, where the optical drive is regarded as a recorder, the drive can be set up by taking account of the power consumption of the recorder and other factors Hence, an optical drive having excellent portability can be obtained.

What is claimed is:

1. A near-field optical head comprising:
    a substrate having opposing first and second surfaces and being provided with a hole extending between the first and second surfaces to define a microscopic aperture at one of the first and second surfaces of the substrate for producing near-field light proximate the microscopic aperture;
    an aperture-limiting member disposed inside the hole between the first and second surfaces; and
    moving means for moving the aperture-limiting member to selectively vary the size of the microscopic aperture.

2. A near-field optical head comprising:
    a substrate having opposing first and second surfaces and being provided with a hole extending between the first and second surfaces to define a microscopic aperture at one of the first and second surfaces of the substrate for producing near-field light proximate the microscopic aperture;
    a pair of aperture-limiting members disposed inside the hole between the first and second surfaces; and
    moving means for moving the aperture-limiting members to selectively vary the size of the microscopic aperture.

3. A near-field optical head according to one of claims 1 and 2; wherein the microscopic aperture has a bottom surface, and the aperture-limiting member has a bottom surface flush with the bottom surface of the microscopic aperture.

4. A near-field optical head according to one of claims 1 and 2; wherein the moving means comprises one of a piezoelectric actuator and an electrostatic actuator.

5. A near-field optical head comprising:
    a substrate having opposing first and second surfaces and being provided with a hole extending between the first and second surfaces to define a microscopic aperture at one of the first and second surfaces of the substrate for producing near-field light proximate the microscopic aperture; and an aperture-limiting member disposed inside the hole between the first and second surfaces, the aperture-limiting member being heat-expandable for varying the size of the microscopic aperture.

6. A near-field optical head according to claim 5; further comprising heating means for heating the aperture-limiting member.

7. A near-field optical head according to one of claims 5 and 6; wherein the aperture-limiting member comprises one of a member formed of a polymer material having a high coefficient of thermal expansion and a polymer material defining a closed chamber filled with a gas.

8. A method of fabricating a near-field optical head having a substrate provided with a hole therethrough forming a microscopic aperture at one surface of the substrate, an aperture-limiting member disposed inside the hole, and moving means for moving the aperture-limiting member to vary the size of the microscopic aperture, the method comprising the steps of:

forming the hole through the substrate such that the microscopic aperture is formed at one end of the hole at the one surface of the substrate;

forming a support member for supporting the moving means on a surface of the substrate opposite the surface at which the microscopic aperture is formed;

depositing a sacrificial film on the substrate to cover the support means and at least part of an inner surface of the hole;

depositing a light-blocking film on the sacrificial film and patterning the light-blocking film to form the aperture-limiting member;

exposing the support member by removing the sacrificial film therefrom;

forming the moving means on the support member and a part of the aperture-limiting member; and removing the sacrificial film so that the light-blocking film is capable of undergoing relative movement with respect to the hole.

9. A method according to claim 8; wherein the step of forming the moving means comprises the step of providing one of a piezoelectric actuator and an electrostatic actuator in contact with the support member and the aperture-limiting member such that movement of the moving means causes the aperture-limiting member to undergo movement inside the hole.

10. A method according to claim 8; wherein the step of removing the sacrificial film comprises removing the sacrificial film at locations except for the inner surface of the hole.

11. A method of fabricating a near-field optical head having a substrate provided with a hole therethrough forming a microscopic aperture at one surface of the substrate, an aperture-limiting member disposed inside the hole, and moving means for moving the aperture-limiting member to vary the size of the microscopic aperture, the method comprising the steps of:

forming the hole through the substrate such that the microscopic aperture is formed at one end of the hole at the one surface of the substrate;

depositing a film comprising a high polymer having a high coefficient of thermal expansion on an inner surface of the hole; and patterning the high polymer film to form the aperture-limiting member so that the high polymer film is responsive to heat to undergo thermal expansion to thereby selectively vary the size of the aperture.

12. A method of fabricating a near-field optical head having a substrate provided with a hole therethrough forming a microscopic aperture at one surface of the substrate, and an aperture-limiting member disposed inside the hole and being expandable to vary the size of the microscopic aperture, the method comprising the steps of:

forming the hole through the substrate such that the microscopic aperture is formed at one end of the hole at the one surface of the substrate;

depositing a first film formed of a high polymer having a high coefficient of thermal expansion on an inner surface of the hole;

depositing a sacrificial film on the first film of the high polymer and patterning the sacrificial film to cover only a portion of the first film inside the hole;

depositing a second film formed of a high polymer on the sacrificial film;

forming a gas-insert hole in the second film formed of the high polymer;

removing at least a portion of the sacrificial film sandwiched between the first and second films using the hole to thereby form a hollow portion between the first and second films;

injecting a gas into the hollow portion; and closing the gas-insert hole by depositing a high polymer on the second film formed of the high polymer to close the gas-insert hole and to thereby form a heat-expandable high polymer member inside the hole to serve as the aperture-limiting member.

13. An optical drive having a near-field optical head having a substrate with opposed first and second surfaces and provided with a hole therethrough extending between the first and second surfaces forming a microscopic aperture at one of the first and second surfaces for producing near-field light proximate the microscopic aperture used to record and/or read information to and from a recording medium rotating at a given rotational speed, the optical drive comprising:

aperture size control means having an aperture-limiting member disposed inside the hole between the first and second surfaces and having moving means for moving the aperture-limiting member to vary the size of the microscopic aperture by moving the aperture-limiting member;

rotational speed control means for controlling the rotational speed of the recording medium; and operation mode control means for determining a combination of a data transfer rate and a recording density.

14. An optical drive according to 13; wherein the data transfer rate and the recording density can be selected from values distributed successively within a range defined by a preset upper limit value and a preset lower limit value.

15. An optical drive according to either of claims 12 and 14 wherein the operation mode control means controls the aperture-limiting means and the rotational speed control means according to the determined combination of the data transfer rate and the recording density.

16. A near-field optical head comprising: a support member having opposed first and second surfaces and having a hole extending therethrough between the first and second surfaces formed with a tapered sidewall and defining a microscopic aperture at one of the first and second surfaces for producing near-field light proximate the microscopic aperture; a movable member movably mounted to the substrate and disposed in the hole between the first and second surfaces to selectively cover a portion of the hole; and moving means for moving the movable member to vary the amount of light that may pass through the microscopic aperture.

17. A near-field optical head according to claim 16; further comprising another movable member movably mounted to the substrate and disposed in the hole between the first and second surfaces to selectively cover a portion of the hole; wherein the moving means moves both movable members to selectively vary the amount of light that may pass through the microscopic aperture.

18. A near-field optical head according to claim 16; wherein the microscopic aperture has a bottom surface and the movable member has a bottom surface flush with the bottom surface of the microscopic aperture.

19. A near-field optical head according to claim 16; wherein the moving means comprises one of a piezoelectric actuator and an electrostatic actuator.

20. A near-field optical head according to claim 16; wherein the movable member is formed of a heat-expandable material so that it varies the amount of light that may pass through the microscopic aperture based on a temperature thereof.

21. A near-field optical head according to claim 20; further comprising heating means for heating the movable member.

22. A near-field optical head according to claim 20; wherein the movable member comprises a member formed of a high polymer material having a high coefficient of thermal expansion and a high polymer material defining a closed chamber filled with a gas.

23. A near-field optical head according to claim 16; wherein the movable member comprises a thin film formed on the substrate and extending into the hole.

24. A near-field optical head according to claim 23; wherein the moving means is in contact with the thin film at one end and with the support member at another end, the moving means being responsive to an input signal to cause the thin film to become extended into the hole to cover a portion of the microscopic aperture.

25. A near-field optical head according to claim 24; wherein the moving means comprises one of a piezoelectric actuator and an electrostatic actuator.

26. A near-field optical head according to claim 24; wherein the movable member is formed by depositing a sacrificial film on the support member so as to cover at least a portion of the hole, depositing a light-blocking film over the sacrificial film, and etching the sacrificial film to leave the light-blocking partially suspended above the support member.

27. A near-field optical head according to claim 26; wherein the support member includes a projection formed on a surface thereof opposite the microscopic aperture and proximate the hole, the sacrificial film being formed between the projection and the hole, and the light-blocking film being formed to cover the sacrificial film between the projection and at least a portion of the hole over which the sacrificial film is formed, so that removal of the sacrificial film leaves the light-blocking film at least partially suspended over the support member, and the moving means is connected at one end to the projection and at another end to the light-blocking film.

* * * * *